(12) United States Patent
Little (10) Patent No.: US 10,166,608 B2
(45) Date of Patent: Jan. 1, 2019

(54) WOOD-DRILL ADAPTER SYSTEMS

(71) Applicant: Brad Little, Surrey (CA)

(72) Inventor: Brad Little, Surrey (CA)

( * ) Notice: Subject to any disclaimer, the term of this patent is extended or adjusted under 35 U.S.C. 154(b) by 164 days.

(21) Appl. No.: 15/140,495

(22) Filed: Apr. 28, 2016

(65) Prior Publication Data

US 2017/0312831 A1 Nov. 2, 2017

(51) Int. Cl.
*B23B 31/107* (2006.01)
*B23B 31/06* (2006.01)
*B23B 51/04* (2006.01)
*B27C 3/08* (2006.01)
*B28D 1/14* (2006.01)
*B23B 31/00* (2006.01)

(52) U.S. Cl.
CPC .......... *B23B 31/1075* (2013.01); *B23B 31/06* (2013.01); *B23B 51/04* (2013.01); *B27C 3/08* (2013.01); *B28D 1/14* (2013.01); *B23B 31/003* (2013.01); *B23B 31/107* (2013.01); *B23B 2226/75* (2013.01); *B23B 2231/04* (2013.01); *Y10T 408/95* (2015.01); *Y10T 408/957* (2015.01)

(58) Field of Classification Search
CPC . Y10T 408/94; Y10T 408/95; Y10T 408/957; Y10T 279/17821; Y10T 279/3406; Y10T 279/3418; B23B 31/003; B23B 31/06; B23B 31/107; B23B 2231/04; B23B 31/1075
See application file for complete search history.

(56) References Cited

U.S. PATENT DOCUMENTS

| 529,832 A | * | 11/1894 | Phillips | B23B 29/03 408/212 |
| 1,867,359 A | * | 7/1932 | Higby | B23B 31/028 279/105.1 |
| 3,162,066 A | | 12/1964 | Morey et al. | |
| 3,464,655 A | | 9/1969 | Schuman | |

(Continued)

FOREIGN PATENT DOCUMENTS

CN 2118157 10/1992
WO 2011124604 10/2011

*Primary Examiner* — Daniel Howell
*Assistant Examiner* — Yasir Diab
(74) *Attorney, Agent, or Firm* — Integrity Patent Group, PLC; Charles E. Runyan (57) ABSTRACT

A wood-drill adapter system having a wood-drill adapter assembly. The wood-drill adapter assembly includes a core-bit-blank, an adapter-insert, and a set-screw. The core-bit-blank includes a hollow-tubular body, with the hollow-tubular-body including a hole; and the cap includes a cap-plate, and a threaded-coupler. The wood-drill adapter assembly is useful for allowing a user to use a coring-rotary-tool typically used for concrete drilling/coring to drill a circular-opening in a wooden-material using the wood-boring tool. The adapter-insert includes an upper-disc, a tubular-body, a lower-disc, and a set-screw-receiver. The upper-disc includes an upper-face, a lower-face, an outer-circumference, and an upper-aperture. The lower-disc includes an upper-surface, a lower-surface, an external-circumference, and an internal-circumference. The tubular-body includes an outside-circumference, an inside-circumference, an upper-rim, and a lower-rim.

18 Claims, 8 Drawing Sheets

(56) References Cited

U.S. PATENT DOCUMENTS

| | | | |
|---|---|---|---|
| 3,977,480 A | | 8/1976 | Hilding |
| 4,958,966 A | * | 9/1990 | Andrews ............. B23B 31/1075 |
| | | | 279/143 |
| 4,982,632 A | * | 1/1991 | Barmore ................ B25B 13/06 |
| | | | 279/83 |
| 5,226,762 A | * | 7/1993 | Ecker .................. B23B 51/0473 |
| | | | 408/204 |
| 5,393,175 A | * | 2/1995 | Courville .............. B23B 51/042 |
| | | | 175/170 |
| 5,651,646 A | * | 7/1997 | Banke ................ B23B 51/0453 |
| | | | 408/204 |
| 5,695,304 A | * | 12/1997 | Ebert ..................... B27G 15/00 |
| | | | 408/226 |
| 5,957,634 A | * | 9/1999 | Carpinetti ........... B23B 31/1071 |
| | | | 279/143 |
| 6,908,264 B1 | | 6/2005 | Gundy |
| 7,134,815 B2 | | 11/2006 | Steer |
| 2005/0161263 A1 | | 7/2005 | Takano et al. |
| 2007/0280798 A1 | * | 12/2007 | Zeiler ................. B23B 51/0413 |
| | | | 408/201 |
| 2008/0179105 A1 | | 7/2008 | Duncan |

* cited by examiner

WOOD-DRILL ADAPTER SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of coring/drilling and more specifically relates to wood-drill adapter systems.

2. Description of Related Art

A core drill is a specific drill-device designed to remove material leaving a distinct cylinder shaped hole or void, the operation sometimes referred to as coring and/or drilling. In some instances, the vacated material removed may be left in the form of a cylinder. In other instances the vacated material may be chipped or scraped out and therefore destroyed. Core drills may be used for a wide variety of materials such as concrete, rock, earth, wood, plastic, masonry or other materials with mixed results. However, typical core drills are best suited and most commonly used for hard materials (rock, masonry, concrete, etc.).

Commonly a core drill may be used for concrete. When coring concrete, the power source of the drilling operation generally comes from an electric or pneumatic drill which is mounted securely to a frame. The motor assembly is generally affixed to the frame on a track such that the operator may manipulate the motor assembly and the attached cutting head up and down in a linear fashion. The frame arrangement allows the individual who is performing the coring to have a stable base such that the core is smooth and uniform with parallel and clean hole (e.g., precise, accurate, smooth, etc.). Having a stable base also improves safety over handheld methods of drilling and coring.

One such limitation with the common core drill setup is that the setup is limited to concrete, masonry or other hard surfaces as the core drill itself is not suited for softer materials such as wood. Drilling and/or coring of wood typically utilizes a hole saw or self feeding bit to remove material such that the hole left is cylindrical in shape. A drill-press may be employed to provide in instances where the wood to be drilled is small enough to be held or carried by an individual to provide a clean hole, however in instances where the wood is permanently or semi-permanently affixed to a structure a drill-press cannot be used. It would be advantageous to have the safety and stability of a core drill used for concrete with the capability to drill and/or core wooden materials, similar to a drill-press in a novel form. Therefore a suitable solution is desired.

Several attempts have been made to solve the above-mentioned problems such as those found in U.S. and Foreign Pat. and Pub. Nos. U.S. Pat. No. 3,162,066 to Morey et al.; U.S. Pat. No. 3,464,655 to Schuman; U.S. Pat. No. 3,977,480 to Hilding; U.S. Pat. No. 6,908,264 to Gundy; U.S. Pat. No. 7,134,815 to Steer; US 2005/0161263 to Takano et al.; US 2008/0179105 to Duncan; US 2013/0163933 to Richt et al.; CN 2,118,157 to Rubach; and WO 201124604 to Stiebitz. This art is representative of coring/drilling. However, none of the above inventions and patents, taken either singly or in combination, is seen to describe the invention as claimed.

Preferably, a wood-drill adapter system should provide a user with the ability to use a concrete coring drill to drill clean, smooth, and precise holes in a wooden surface and, yet would operate reliably and be manufactured at a modest expense. Thus, a need exists for a reliable wood-drill adapter system to avoid the above-mentioned problems.

BRIEF SUMMARY OF THE INVENTION

In view of the foregoing disadvantages inherent in the known coring/drilling art, the present invention provides a novel wood-drill adapter system. The general purpose of the present invention, which will be described subsequently in greater detail is to provide a device that allows a user to drill holes in wooden surfaces with the use of a core drill intended for concrete coring such that the device allows for clean and precise hole drilling in wood.

Disclosed herein, in a preferred embodiment, is a wood-drill adapter system comprising a wood-drill adapter assembly. Preferably, the wood-drill adapter assembly comprises a core-bit-blank, an adapter-insert, and a set-screw in functional combination. The core-bit-blank may comprise a hollow-tubular body, and a cap in functional combination, where the hollow-tubular-body may include a hole and the cap may include a cap-plate, and a threaded-coupler. The wood-drill adapter assembly is useful for allowing a user to use a coring-rotary-tool typically used for concrete drilling/coring to drill a circular-opening in a wooden-material using the wood-boring tool.

The adapter-insert may comprise an upper-disc, a tubular-body, a lower-disc, and a set-screw-receiver functional combination. The upper-disc may comprise and be defined by an upper-face, a lower-face, an outer-circumference, and an upper-aperture in functional combination. Preferably, the upper-disc comprises a passage to allow the user to insert a punch to remove the wood-boring tool if the wood-boring tool should become broken and/or alternately stuck. The lower-disc may comprise an upper-surface, a lower-surface, an external-circumference, and an internal-circumference, all in functional combination. The tubular-body may comprise an outside-circumference, an inside-circumference, an upper-rim, and a lower-rim in functional combination.

Relationally speaking, the adapter-insert may be affixed within the hollow-tubular body in an end opposite the cap; the lower-face of the upper-disc may be fixedly arranged to the upper-rim of the tubular-body; the outside-circumference of the tubular-body may be fixedly arranged adjacent to the internal-circumference of the lower-disc; and the set-screw-receiver may be affixed to said outside-circumference of the tubular-body.

In the preferred embodiment, the upper-disc may be fixedly arranged to the upper-rim of the tubular-body via a welding process and, similarly, the tubular-body may be fixedly arranged adjacent to the internal-circumference of the lower-disc via a welding process. Preferably, the set-screw-receiver may be affixed to the outside-circumference of the tubular-body via a similar (or suitably equivalent) welding process.

The set-screw-receiver of the adapter-insert and the hole of the hollow-tubular body may be aligned and arranged to allow the user to insert the set-screw to secure a wood-boring tool into the wood-drill adapter assembly. The threaded-coupler of the cap of the hollow-tubular body may be structured and arranged to accept a drive-shank such that the user may thread the drive shank into the threaded-coupler such that the wood-drill adapter assembly is able to be rotated by the coring-rotary-tool. In the preferred embodiment, the coring-rotary-tool may comprise a concrete-coring drill, and the core-bit-blank may comprise a standard concrete-coring bit typical to the art.

Additionally, the preferred embodiment may include the set-screw-receiver and the set-screw each including standard 5/16"—24 threads. The preferred embodiment of hollow-tubular body may be approximately 13-inches in length to allow the user to use the wood-drill adapter assembly in a standard concrete coring device, without a need to modify the concrete coring device. The inside-circumference of the tubular-body and the internal-circumference of the lower-disc preferably may each be 7/16-inches in diameter to accept a standard wood-boring tool typically found in the art. The wood-drill adapter assembly is preferably constructed from steel for durability and longevity during use.

Further described herein, in preferred embodiment, is a method of use for a wood-drill adapter system, the method including the steps of: providing a wood-drill adapter assembly, providing a wood-boring tool, providing a coring-rotary-tool, affixing the wood-drill adapter assembly to the coring-rotary-tool, affixing the wood-boring tool to the wood-drill adapter assembly, placing the coring-rotary-tool adjacent to a material to be drilled/cored, commencing drilling/coring the material to be drilled/cored, ceasing drilling/coring the material to be drilled/cored, removing the wood-boring tool from the wood-drill adapter assembly, and removing the wood-drill adapter assembly from the coring-rotary-tool. Also disclosed herein is a kit, the kit including (at least) the wood-drill adapter assembly, the coring-rotary-tool, the wood-boring tool, and a set of user instructions.

The present invention holds significant improvements and serves as a wood-drill adapter system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, wood-drill adapter system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to coring/drilling and more particularly to a wood-drill adapter system as used to improve the coring/drilling of wooden materials using a concrete coring-rotary-tool typically used for concrete drilling/coring to drill a circular-opening in a wooden-material using a wood-boring tool. Generally speaking, a wood-drill adapter system comprises a wood-drill adapter assembly, with the wood-drill adapter assembly comprising a core-bit-blank, an adapter-insert, and a set-screw in functional combination.

Figure 1:
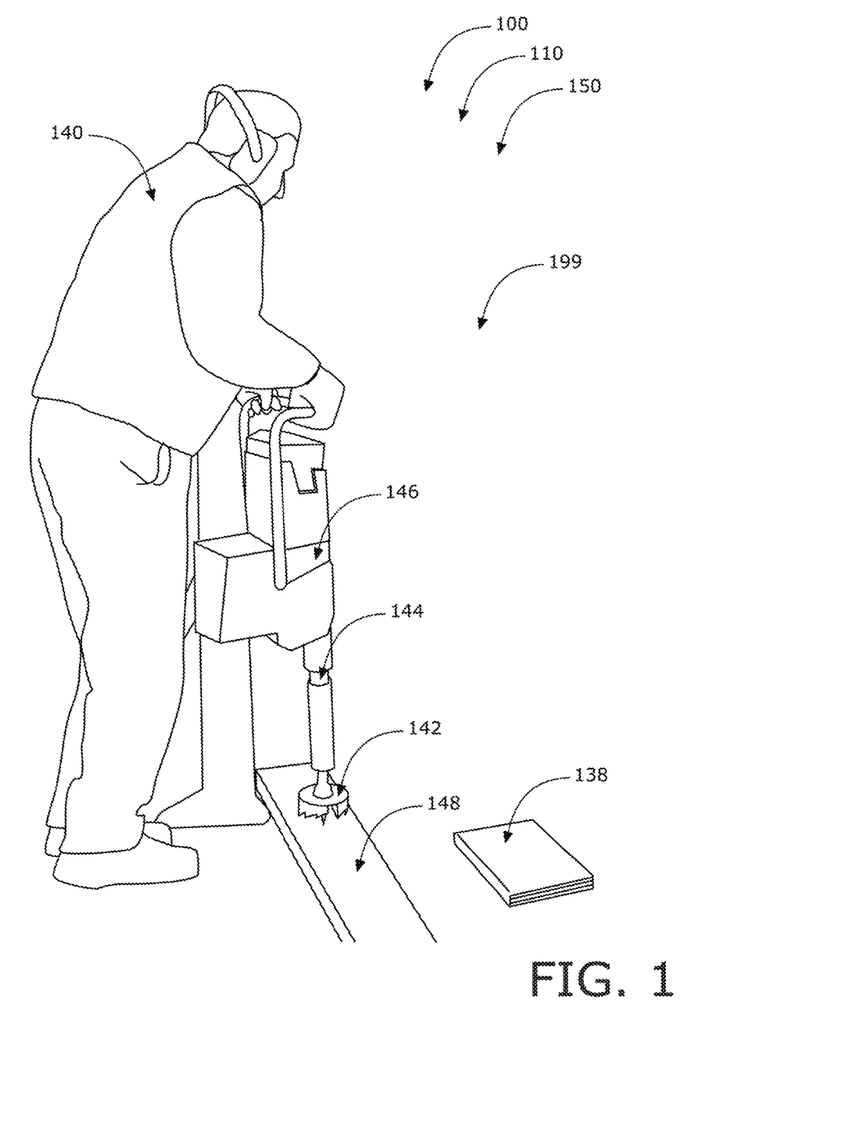
FIG. 1 shows a perspective view illustrating a wood-drill adapter system during an 'in-use' condition showing a user performing a coring/drilling operation using the wood-drill adapter system according to an embodiment of the present invention.

Referring to the drawings by numerals of reference there is shown in FIG. 1, wood-drill adapter system 100 during an 'in-use' condition 150 with user 140 operating coring-rotary-tool 146 (typically used for concrete drilling/coring) to drill a circular-opening in wooden material 148 using wood-boring tool 142.

Figure 2:
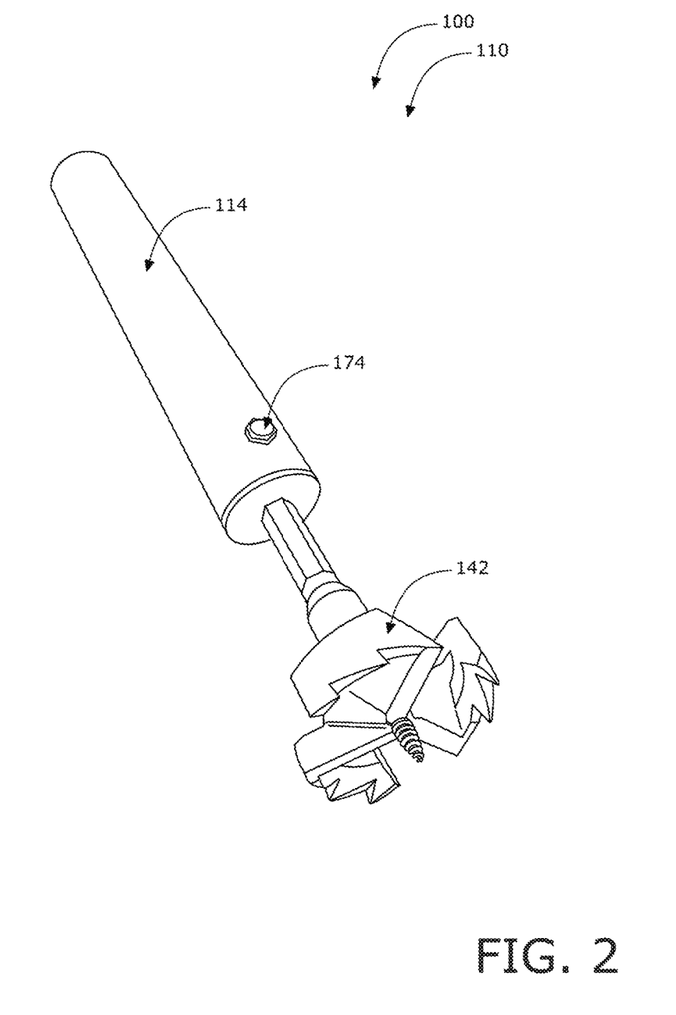
FIG. 2 is a perspective view illustrating the wood-drill adapter assembly of the wood-drill adapter system including a coring-rotary tool according to an embodiment of the present invention of FIG. 1.
Figure 3:
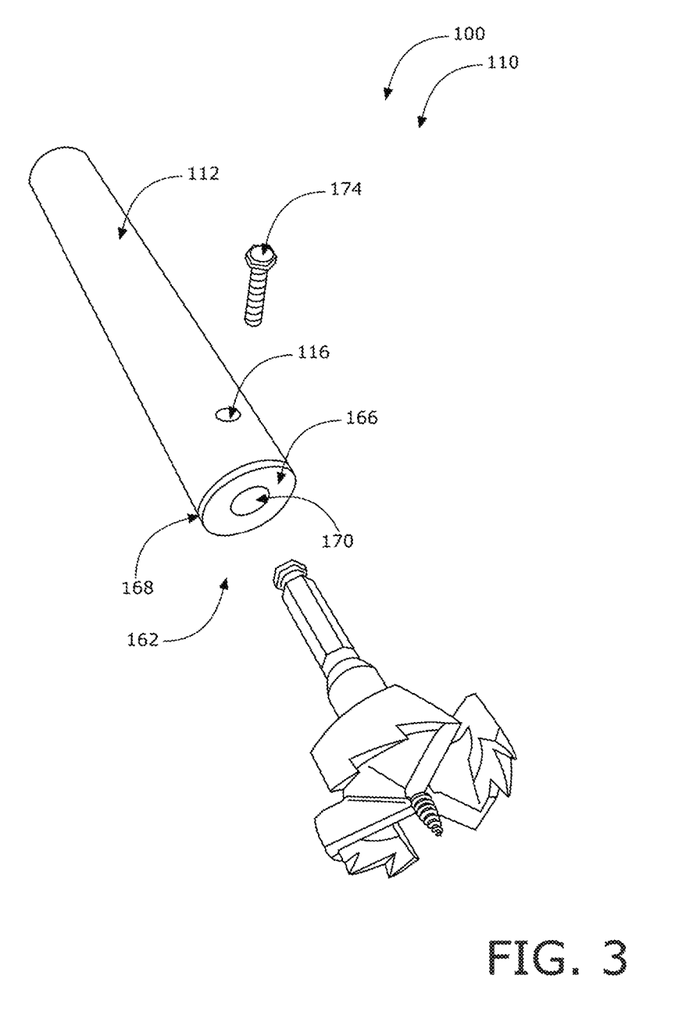
FIG. 3 is an exploded-perspective view illustrating wood-drill adapter assembly including a coring-rotary tool according to an embodiment of the present invention of FIGS. 1-2.
Figure 4:
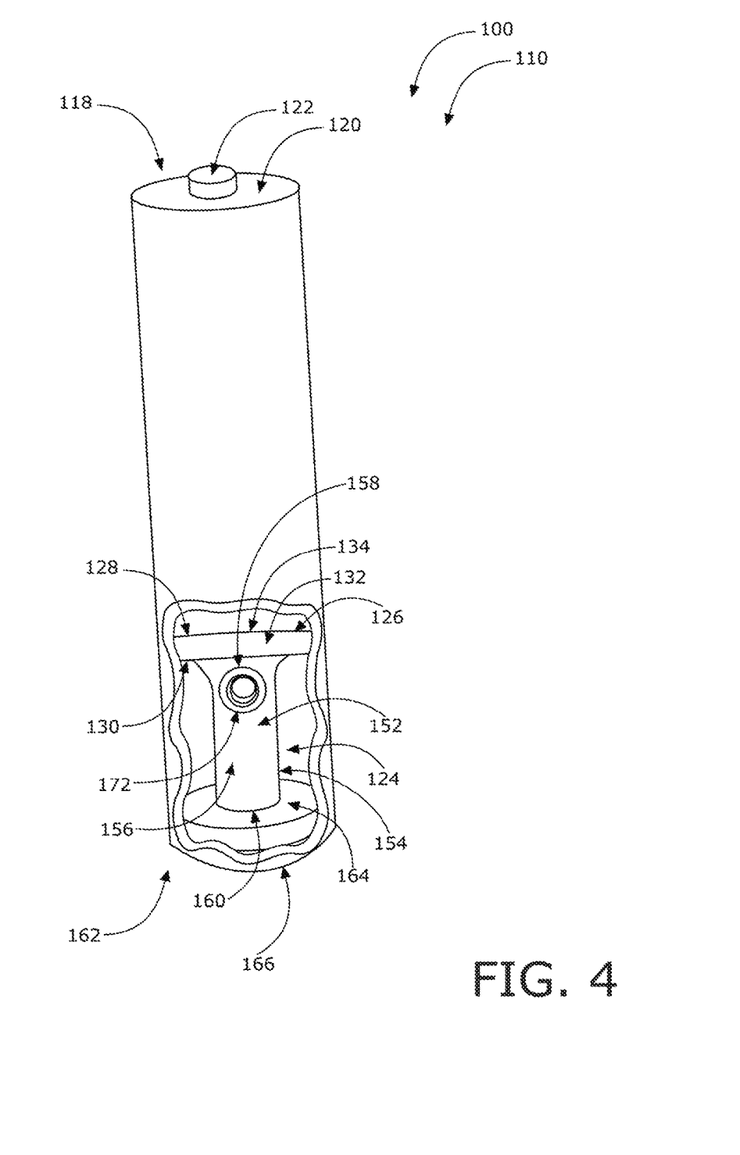
FIG. 4 is a perspective view illustrating the adapter-insert assembly comprising an upper-disc, a tubular-body, lower-disc, and a set-screw-receiver according to an embodiment of the present invention of FIGS. 1-3.

Referring now to FIGS. 2-4, the wood-drill adapter system 100 may comprise wood-drill adapter assembly 110, where wood-drill adapter assembly 110 may comprise core-bit-blank 112, adapter-insert 124, and set-screw 174 in functional combination. Core-bit-blank 112 may comprise hollow-tubular body 114 and cap 118 in functional combination. Hollow-tubular-body 114 may include hole 116, and cap 118 may comprise cap-plate 120 and threaded-coupler 122, all in functional combination.

Threaded-coupler 122 of cap 118 of hollow-tubular body 114 may be structured and arranged to accept drive-shank 144 such that user 140 may thread drive-shank 144 into threaded-coupler 122 such that wood-drill adapter assembly 110 may be able to be rotated by coring-rotary-tool 146. Adapter-insert 124 may comprise upper-disc 126, tubular-body 152, lower-disc 162, and set-screw-receiver 172 functional combination. Adapter-insert 124 may be affixed within hollow-tubular body 114 in an end opposite cap 118.

Upper-disc 126 may comprise and be defined by upper-face 128, lower-face 130, outer-circumference 132, and upper-aperture 134 in functional combination; and lower-disc 162 may comprise upper-surface 164, lower-surface 166, external-circumference 168, and internal-circumference 170, all in functional combination. In some embodiments internal-circumference 170 may be round, and in other embodiments internal-circumference 170 may be other shapes to accept (e.g., square, hexagonal, octagon, triangle, etc.) to accept wood-boring tool 142 of different types. Upper-disc 126 may further comprise a passage (not shown) to allow user 140 to insert a punch (or similar device) to remove wood-boring tool 142 if wood-boring tool 142 should become broken and/or stuck. Tubular-body 152 may comprise outside-circumference 154, inside-circumference 156, upper-rim 158, and lower-rim 160 in functional combination.

Relationally speaking, lower-face 130 of upper-disc 126 may be fixedly arranged to upper-rim 158 of tubular-body 152; upper-disc 126 may be fixedly arranged to upper-rim 158 of tubular-body 152 via a welding process, or may be fixedly arranged by being machined from a single piece of material. Similarly, outside-circumference 154 of tubular-body 152 may be fixedly arranged adjacent to internal-circumference 170 of lower-disc 162; where tubular-body 152 may fixedly arranged adjacent to internal-circumference 170 of lower-disc via a welding process, or may be fixedly arranged by being machined from a single piece of material.

Set-screw-receiver 172 of adapter-insert 124 and hole 116 of hollow-tubular body 114 may be aligned and arranged to allow user 140 to insert set-screw 174 to secure wood-boring tool 142 into wood-drill adapter assembly 110. Set-screw-receiver 172 may be affixed to outside-circumference 154 of tubular-body 152 via a welding process or by being machined from a single piece of material.

Some embodiments of hollow-tubular body 114 may be approximately 13-inches in length to allow user to use wood-drill adapter assembly 110 in a standard concrete coring device. Inside-circumference 156 of tubular-body 152 and internal-circumference 170 of lower-disc 162 may each be 7/16-inches in diameter to accept a standard size of wood-boring tool 142. Set-screw-receiver 172 and set-screw 174 each may each comprise standard 5/16"—24 threads, other thread pitches and sizes may be used dependent upon available materials and user preferences.

Figure 6A:
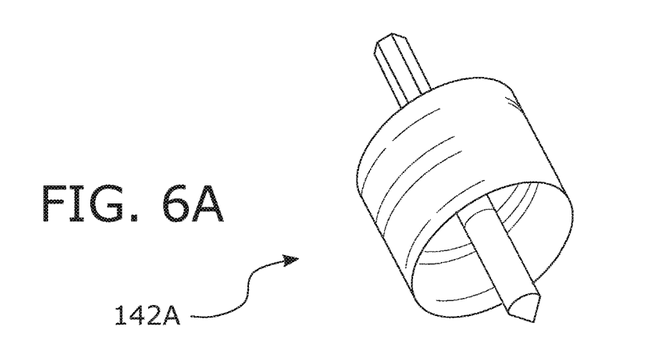
FIG. 6A-6B are perspective views of tools useful with invention adapters.
Figure 6B:
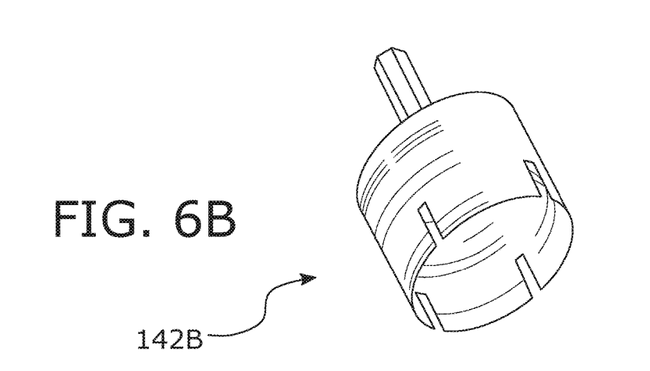
Figure 7:
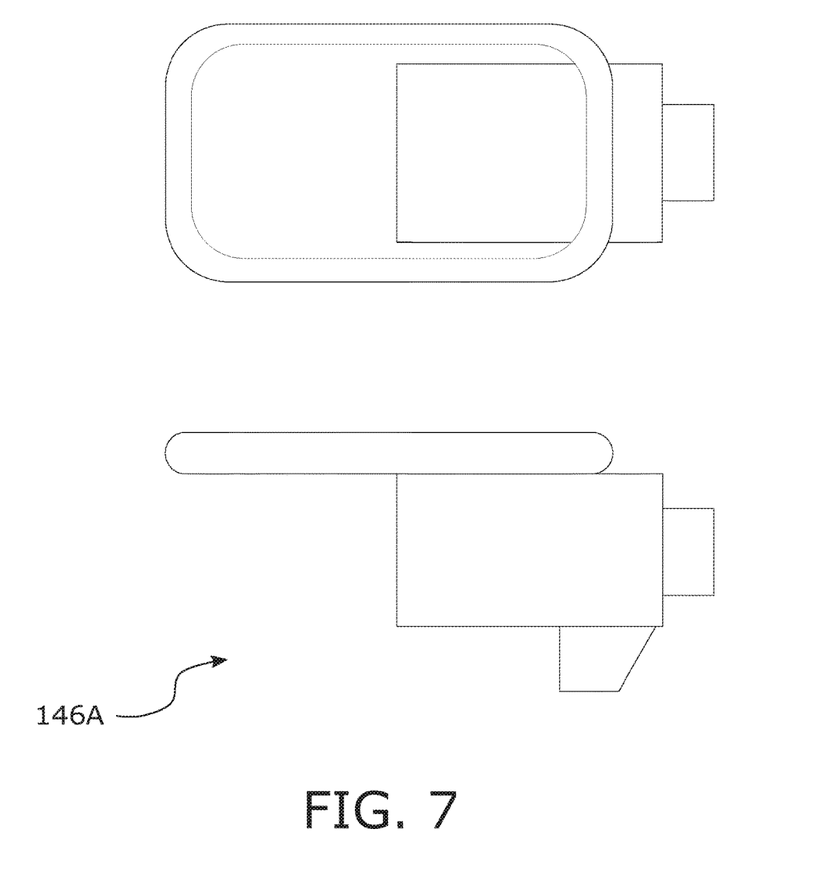
FIG. 7 is a schematic view of a concrete-coring drill.
Figure 8:
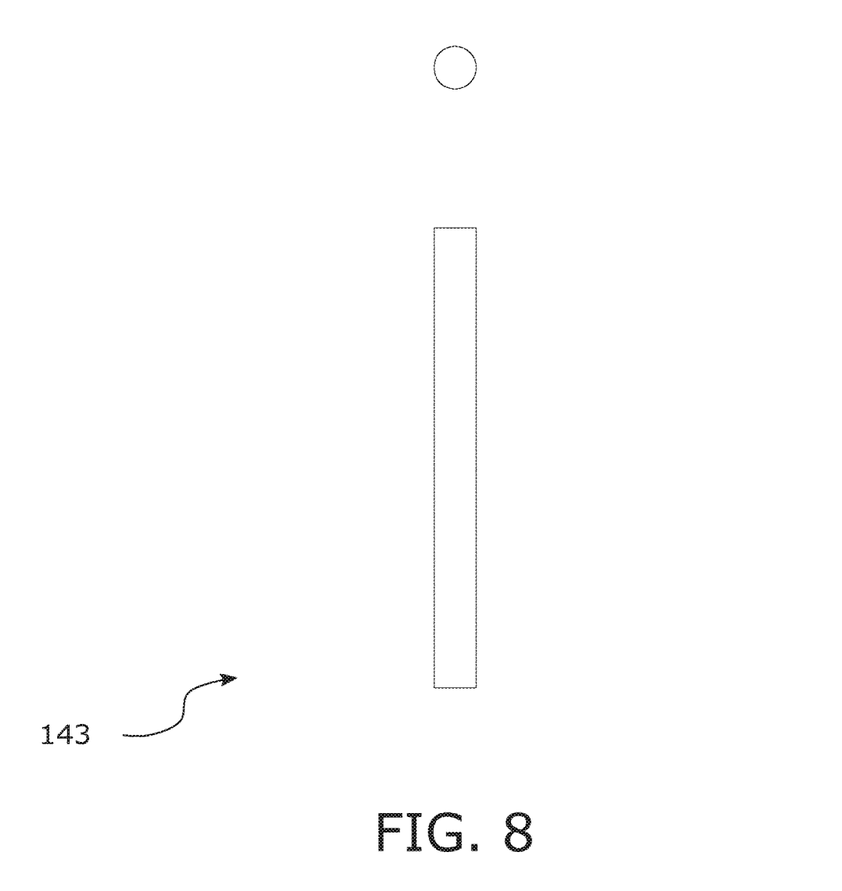
FIG. 8 is a plan view and an end view of a punch.

In certain embodiments, wood-boring tool 142 may comprise a hole-saw 142A; other embodiments may include a self-feed-drill-bit or other similar cutting tools. Preferably, coring-rotary-tool 146 comprises a concrete-coring drill and core-bit-blank 112 comprises a standard concrete-coring bit cut to the desired length. Alternate embodiments may include other types of coring-rotary-tool 146 and other types of core-bit-blank 112. Wood-drill adapter assembly 110 may be constructed from steel for durability and longevity during use, or other suitable materials depending upon the specific application, job requirements, and user preferences.

Wood-drill adapter system 100 may be sold as kit 199 (as shown in FIG. 1) comprising the following parts: at least one wood-drill adapter assembly 110 at least one coring-rotary-tool 146; at least one wood-boring tool 142; and at least one set of user instructions 138. The kit has instructions such that functional relationships are detailed in relation to the structure of the invention (such that the invention can be used, maintained, or the like in a preferred manner). Wood-drill adapter system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different adapter combinations, parts may be sold separately, etc., may be sufficient.

Figure 5:
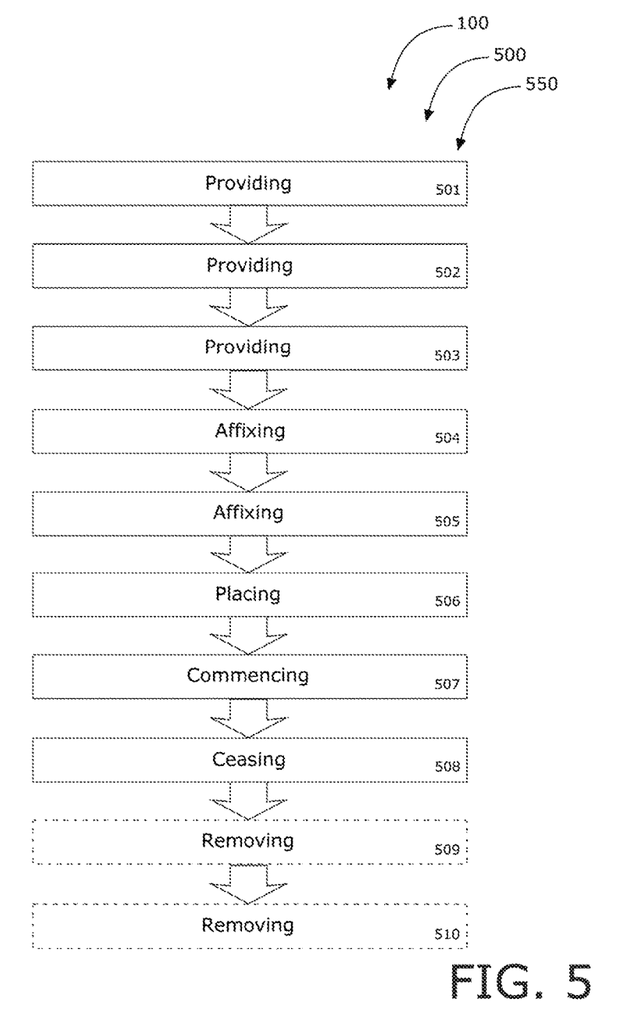
FIG. 5 is a flowchart illustrating a method of use for the wood-drill adapter system according to an embodiment of the present invention of FIGS. 1-4.

Referring now to FIG. 5 showing flowchart 550 illustrating method of use 500 for wood-drill adapter system 100 according to an embodiment of the present invention of FIGS. 1-4. As shown, method of use 500 may comprise the steps of: step one 501, providing wood-drill adapter assembly 100; step two 502, providing a wood-boring tool 142; step three 503, providing a coring-rotary-tool 146; step four 504, affixing wood-drill adapter assembly 110 to coring-rotary-tool 146; step five 505, affixing wood-boring tool 142 to wood-drill adapter assembly 110; step six 506, placing coring-rotary-tool 146 adjacent to material 148 to be drilled/cored; step seven 507, commencing drilling/coring material 148 to be drilled/cored; step eight 508, ceasing drilling/coring material 148 to be drilled; step nine 509, removing wood-boring tool 142 from wood-drill adapter assembly 110; and step ten 510, removing wood-drill adapter assembly 110 from coring-rotary-tool 146.

It should be noted that step nine 509 and step ten 510 are an optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A wood-drill adapter system comprising:
   a wood-drill adapter assembly comprising;
      a core-bit-blank comprising;
         a hollow-tubular body including;
            a hole;
         a cap comprising;
            a cap-plate; and
            a threaded-coupler;
      an adapter-insert comprising;
         an upper-disc comprising;
            an upper-face;
            an lower-face;
            an outer-circumference; and
            an upper-aperture;
         a tubular-body comprising;
            an outside-circumference;
            an inside-circumference;
            an upper-rim; and
            a lower-rim;
         a lower-disc comprising;
            an upper-surface;
            a lower-surface;
            an external-circumference; and an internal-circumference;
a set-screw-receiver; and
a set-screw;
wherein said wood-drill adapter system comprises said wood-drill adapter assembly in functional combination;
wherein said wood-drill adapter assembly comprises said core-bit-blank, said adapter-insert, and said set-screw in functional combination;
wherein said core-bit-blank comprises said hollow-tubular body, and said cap in functional combination;
wherein said hollow-tubular-body includes said hole;
wherein said cap comprises said cap-plate, and said threaded-coupler in functional combination;
wherein said adapter-insert comprises said upper-disc, said tubular-body, said lower-disc, and said set-screw-receiver functional combination;
wherein said an upper-disc comprises and is defined by said upper-face, said lower-face, said outer-circumference, and said upper-aperture in functional combination;
wherein said tubular-body comprises said outside-circumference, said inside-circumference, said upper-rim, and said lower-rim in functional combination;
wherein said lower-disc comprises said upper-surface, said lower-surface, said external-circumference, and said internal-circumference in functional combination;
wherein said adapter-insert is affixed within said hollow-tubular body in an end opposite said cap;
wherein said lower-face of said upper-disc is fixedly arranged to said upper-rim of said tubular-body;
wherein said outside-circumference of said tubular-body is fixedly arranged adjacent to said internal-circumference of said lower-disc;
wherein said set-screw-receiver is affixed to said outside-circumference of said tubular-body;
wherein said set-screw-receiver of said adapter-insert and said hole of said hollow-tubular body are aligned and arranged to allow a user to insert said set-screw to secure a wood-boring tool into said wood-drill adapter assembly;
wherein said threaded-coupler of said cap of said hollow-tubular body is structured and arranged to accept a drive-shank such that said user may thread said drive-shank into said threaded-coupler such that said wood-drill adapter assembly is able to be rotated by a coring-rotary-tool; and
wherein said wood-drill adapter assembly is useful for allowing said user to use said coring-rotary-tool typically used for concrete drilling/coring to drill a circular-opening in a wooden-material using said wood-boring tool.

2. The wood-drill adapter system of claim 1 wherein said upper-disc further comprises a passage to allow said user to insert a punch to remove said wood-boring tool if said wood-boring tool should become broken and alternately stuck.

3. The wood-drill adapter system of claim 1 wherein said hollow-tubular body is approximately 13-inches in length to allow said user to use said wood-drill adapter assembly in a standard concrete coring device.

4. The wood-drill adapter system of claim 1 wherein said inside-circumference of said tubular-body and said internal-circumference of said lower-disc each are of 7/16-inches in diameter to accept a standard wood-boring tool.

5. The wood-drill adapter system of claim 1 wherein said upper-disc is fixedly arranged to said upper-rim of said tubular-body via a welding process.

6. The wood-drill adapter system of claim 1 wherein said upper-disc is fixedly arranged to said upper-rim of said tubular-body by being machined from a single piece of material.

7. The wood-drill adapter system of claim 1 wherein said tubular-body is fixedly arranged adjacent to said internal-circumference of said lower-disc via a welding process.

8. The wood-drill adapter system of claim 1 wherein said tubular-body is fixedly arranged adjacent to said internal-circumference of said lower-disc by being machined from a single piece of material.

9. The wood-drill adapter system of claim 1 wherein said wherein said set-screw-receiver is affixed to said outside-circumference of said tubular-body via a welding process.

10. The wood-drill adapter system of claim 1 wherein said wherein said set-screw-receiver is affixed to said outside-circumference of said tubular-body by being machined from a single piece of material.

11. The wood-drill adapter system of claim 1 wherein said wood-boring tool comprises a hole-saw.

12. The wood-drill adapter system of claim 1 wherein said wood-boring tool comprises a self-feed-drill-bit.

13. The wood-drill adapter system of claim 1 wherein said coring-rotary-tool comprises a concrete-coring drill.

14. The wood-drill adapter system of claim 1 wherein said core-bit-blank comprises a standard concrete-coring bit.

15. The wood-drill adapter system of claim 1 wherein said set-screw-receiver and said set-screw each comprise standard 5/16"—24 threads.

16. The wood-drill adapter system of claim 1 wherein said wood-drill adapter assembly is constructed from steel for durability and longevity during use.

17. A wood-drill adapter system comprising:
a wood-drill adapter assembly comprising;
a core-bit-blank comprising;
a hollow-tubular body including;
a hole;
a cap comprising;
a cap-plate; and
a threaded-coupler;
an adapter-insert comprising;
an upper-disc comprising;
an upper-face;
a lower-face;
an outer-circumference; and
an upper-aperture;
a tubular-body comprising;
an outside-circumference;
an inside-circumference;
an upper-rim; and
a lower-rim;
a lower-disc comprising;
an upper-surface;
a lower-surface;
an external-circumference; and
an internal-circumference;
a set-screw-receiver; and
a set-screw;
wherein said wood-drill adapter system comprises said wood-drill adapter assembly in functional combination;
wherein said wood-drill adapter assembly comprises said core-bit-blank, said adapter-insert, and said set-screw in functional combination;
wherein said core-bit-blank comprises said hollow-tubular body, and said cap in functional combination;
wherein said hollow-tubular-body includes said hole;

wherein said cap comprises said cap-plate, and said threaded-coupler in functional combination;

wherein said adapter-insert comprises said upper-disc, said tubular-body, said lower-disc, and said set-screw-receiver functional combination;

wherein said an upper-disc comprises and is defined by said upper-face, said lower-face, said outer-circumference, and said upper-aperture in functional combination;

wherein said tubular-body comprises said outside-circumference, said inside-circumference, said upper-rim, and said lower-rim in functional combination;

wherein said lower-disc comprises said upper-surface, said lower-surface, said external-circumference, and said internal-circumference in functional combination;

wherein said adapter-insert is affixed within said hollow-tubular body in an end opposite said cap;

wherein said lower-face of said upper-disc is fixedly arranged to said upper-rim of said tubular-body;

wherein said outside-circumference of said tubular-body is fixedly arranged adjacent to said internal-circumference of said lower-disc;

wherein said set-screw-receiver is affixed to said outside-circumference of said tubular-body;

wherein said set-screw-receiver of said adapter-insert and said hole of said hollow-tubular body are aligned and arranged to allow a user to insert said set-screw to secure a wood-boring tool into said wood-drill adapter assembly;

wherein said threaded-coupler of said cap of said hollow-tubular body is structured and arranged to accept a drive-shank such that said user may thread said drive shank into said threaded-couple such that said wood-drill adapter assembly is able to be rotated by a coring-rotary-tool;

wherein said wood-drill adapter assembly is useful for allowing said user to use said coring-rotary-tool typically used for concrete drilling/coring to drill a circular-opening in a wooden-material using said wood-boring tool;

wherein said upper-disc further comprises a passage to allow said user to insert a punch to remove said wood-boring tool if said wood-boring tool should become broken and alternately stuck;

wherein said hollow-tubular body is approximately 13-inches in length to allow said user to use said wood-drill adapter assembly in a standard concrete coring device;

wherein said inside-circumference of said tubular-body and said internal-circumference of said lower-disc each are of 7/16-inches in diameter to accept a standard wood-boring tool;

wherein said upper-disc is fixedly arranged to said upper-rim of said tubular-body via a welding process;

wherein said tubular-body is fixedly arranged adjacent to said internal-circumference of said lower-disc via a welding process;

wherein said set-screw-receiver is affixed to said outside-circumference of said tubular-body via a welding process;

wherein said coring-rotary-tool comprises a concrete-coring drill;

wherein said core-bit-blank comprises a standard concrete-coring bit;

wherein said set-screw-receiver and said set-screw each comprise standard 5/16"—24 threads; and wherein said wood-drill adapter assembly is constructed from steel for durability and longevity during use.

18. The wood-drill adapter system of claim 17 further comprising a kit including:
   said wood-drill adapter assembly;
   said coring-rotary-tool;
   said wood-boring tool; and
   a set of user instructions.

* * * * *